Aug. 17, 1948.　　　C. B. SUES　　　2,447,041
TWO-CYCLE ENGINE, COMBINED
PUMP AND MOTOR CYLINDER

Filed Dec. 18, 1944　　　6 Sheets-Sheet 1

INVENTOR.
CARL B. SUES
BY Carlos G. Stratton
ATTORNEY.

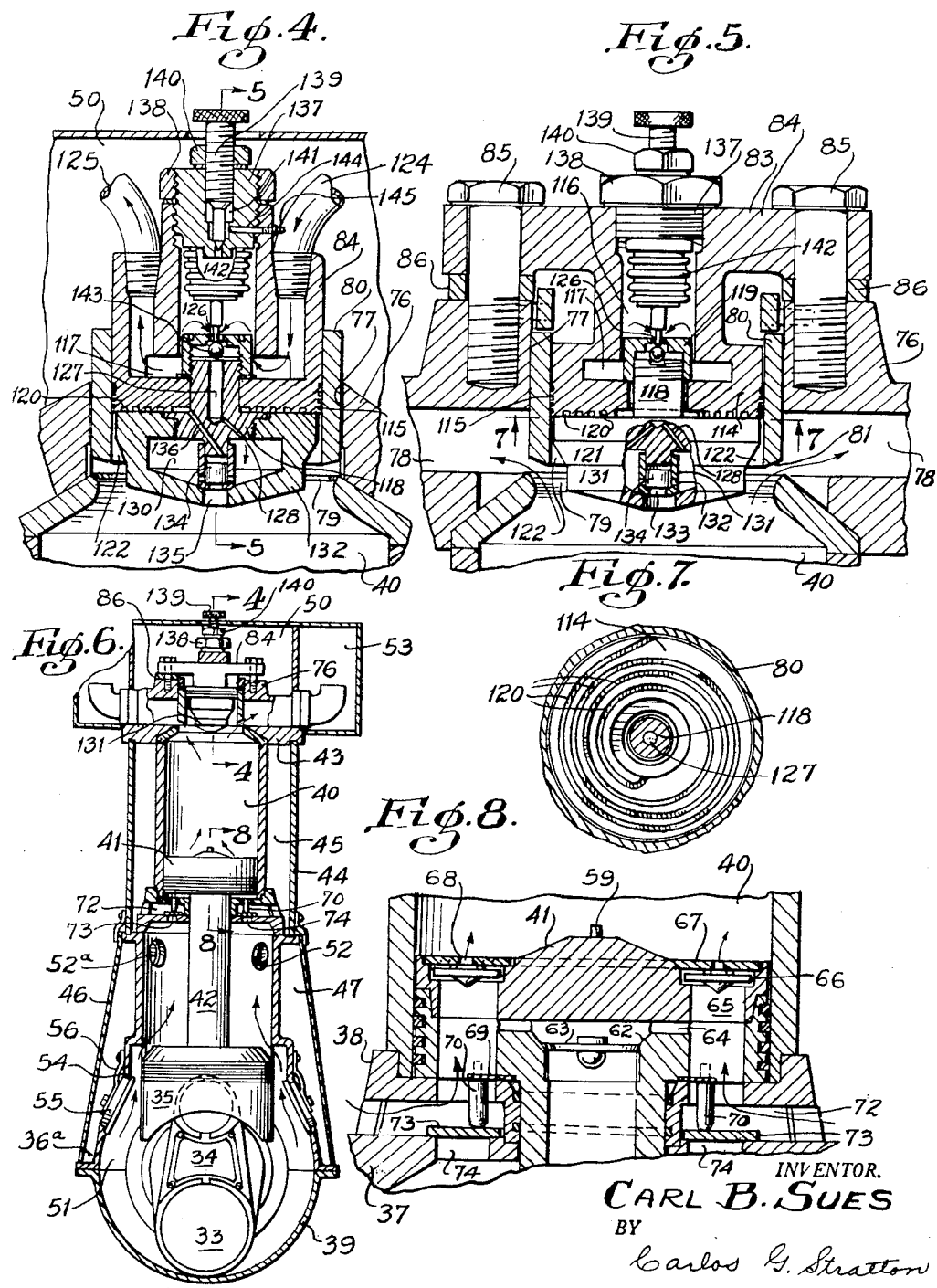

Aug. 17, 1948.  C. B. SUES  2,447,041
TWO-CYCLE ENGINE, COMBINED
PUMP AND MOTOR CYLINDER
Filed Dec. 18, 1944  6 Sheets-Sheet 3
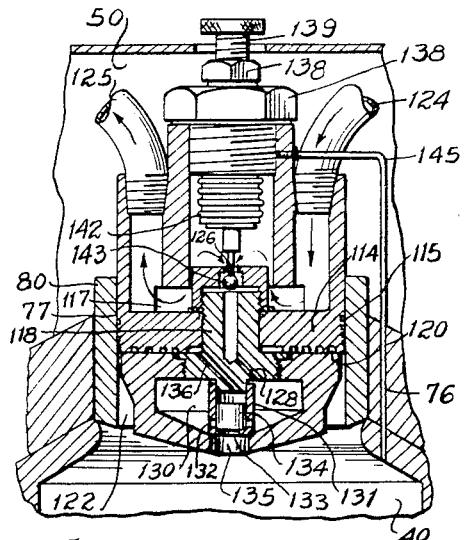
Fig. 9.
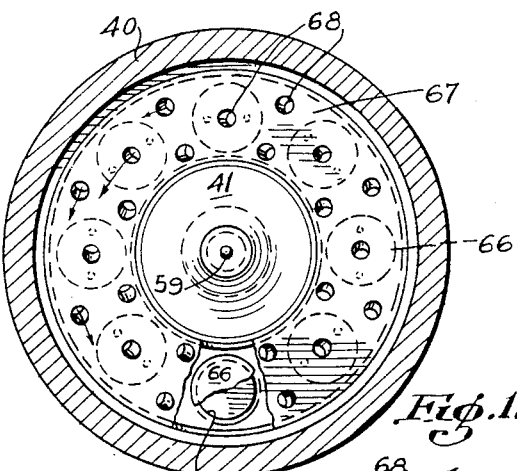
Fig. 11.
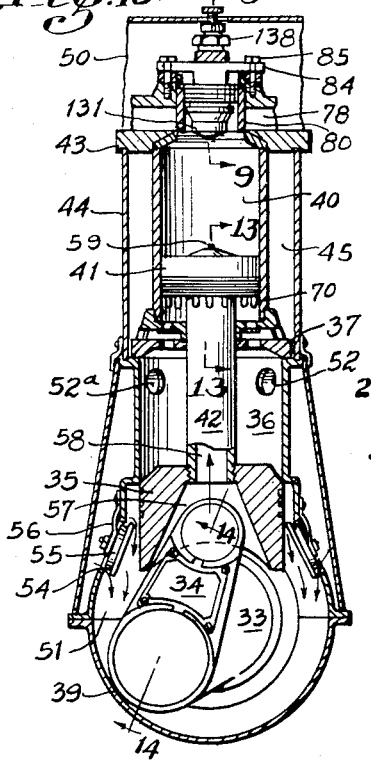
Fig. 10.
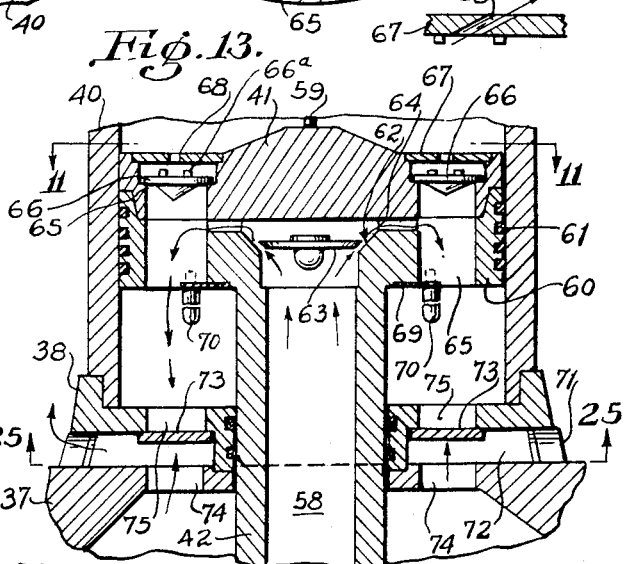
Fig. 13.
Fig. 12.
Fig. 14.
INVENTOR.
CARL B. SUES
BY
Carlos G. Stratton
ATTORNEY.

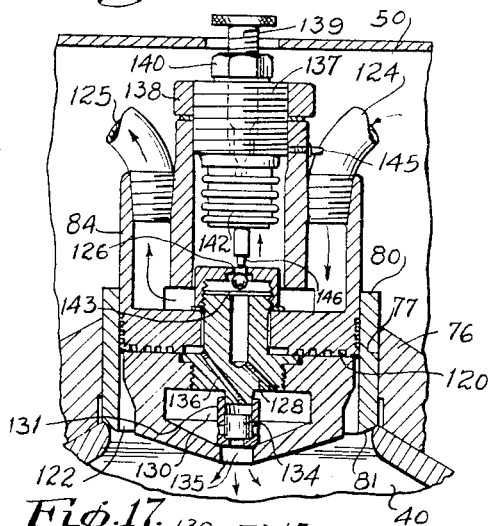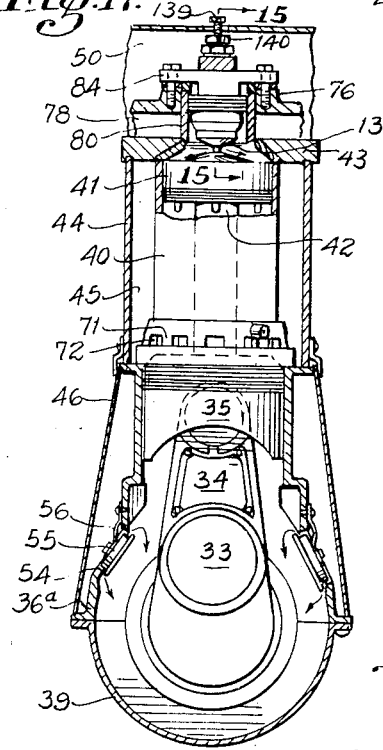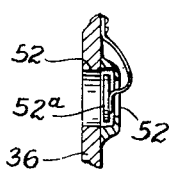

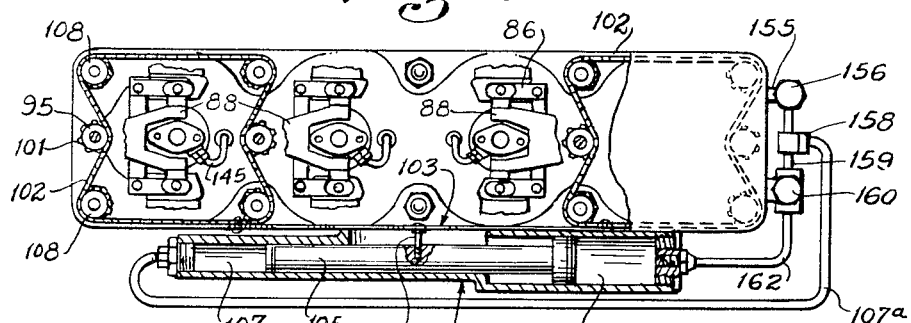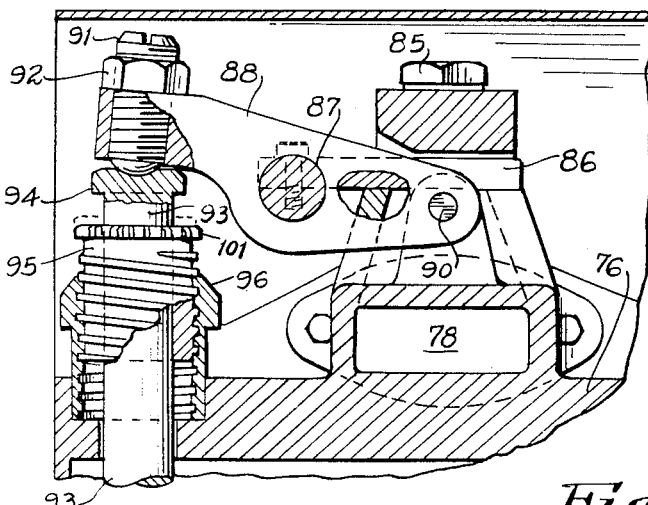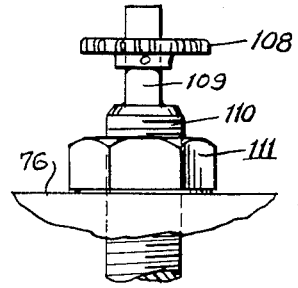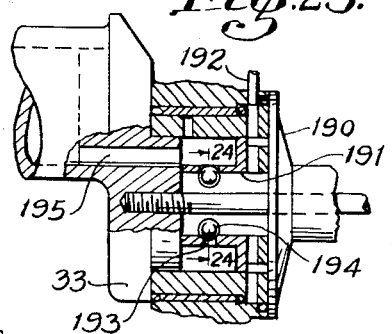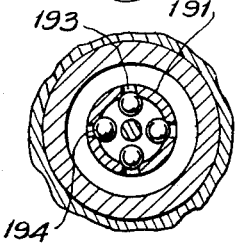

Aug. 17, 1948.                C. B. SUES                  2,447,041
                      TWO-CYCLE ENGINE, COMBINED
                        PUMP AND MOTOR CYLINDER
Filed Dec. 18, 1944                              6 Sheets-Sheet 6
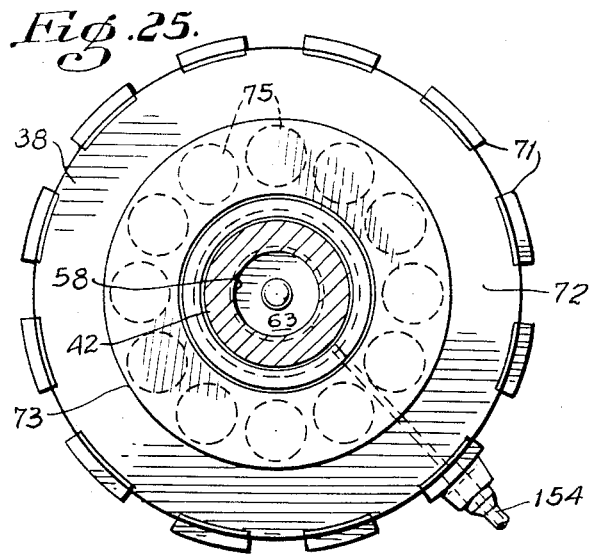
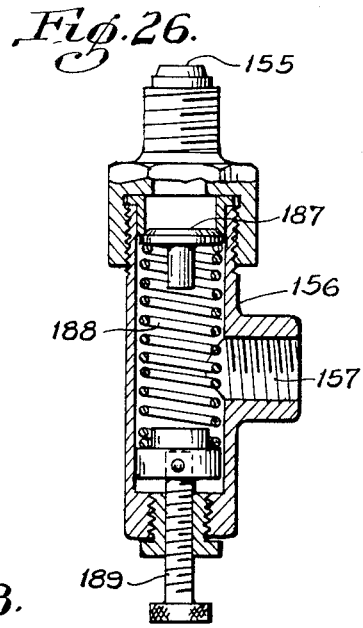
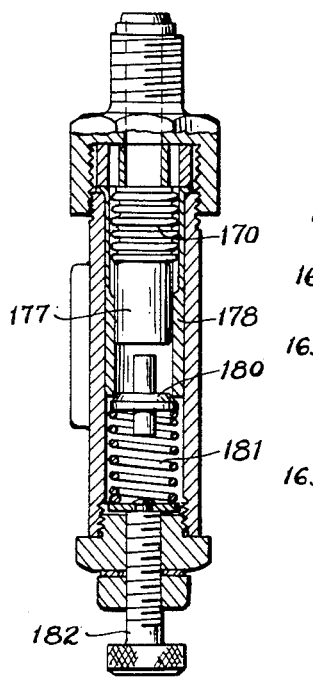
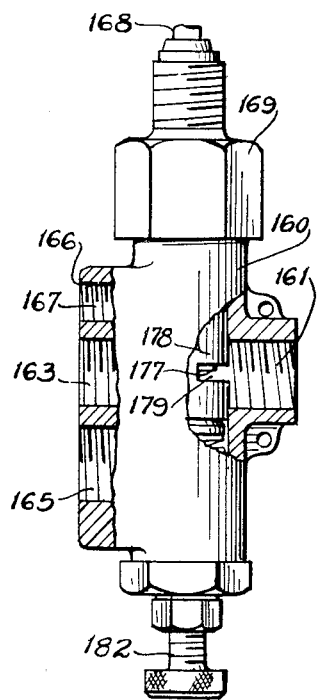
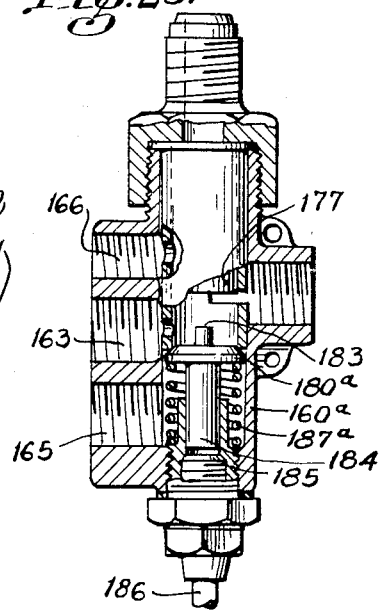
INVENTOR.
CARL B. SUES
BY
Carlos G. Stratton
ATTORNEY.

Patented Aug. 17, 1948

2,447,041

UNITED STATES PATENT OFFICE 2,447,041

TWO-CYCLE ENGINE, COMBINED PUMP AND MOTOR CYLINDER

Carl B. Sues, Los Angeles, Calif.

Application December 18, 1944, Serial No. 568,619

22 Claims. (Cl. 123—66)

This invention relates to internal combustion engines, and more especially to a Diesel type engine having compression ignition or explosion.

An object of the invention is to provide two cycle engine, combined pump and motor cylinder of the type under consideration having reduced weight per unit of horse-power made possible by simplified construction wherein the supply of air available for combustion is greatly concentrated.

Another object of the invention is to provide in an engine of the character described higher efficiency because of higher supercharge pressures possible by novel cooling means accomplished by using a great deal more air flowing through the engine than would be necessary to produce its graded horse-power output.

An additional object is to provide in an engine of the character described improved or increased efficiency due to more effective cooling of the engine parts wherein the heat from these parts is utilized in the fuel combustion processes.

A further object of the invention is to provide in an engine of the character described means and a method of cooling which does not require the use of water jackets and wherein the engine is substantially and internally air cooled thus permitting lower weight per unit of horse-power.

A further object of the invention is to provide an engine of the character described adapted for operation in reduced temperatures, such as aircraft at high altitude, wherein efficiency is maintained because of the utilization of the principal of internal air cooling.

Another object of the invention is the provision of an engine in which the structure is simplified by the substantial elimination of a cam shaft due to the operation of the engine as a two-cycle type wherein the only valve is an exhaust valve actuated directly from the crank shaft.

A further object is the provision of an engine of the character described wherein maximum supercharge pressure may be maintained even at low speeds, which function is impossible with ordinary turbo-supercharging auxiliaries, and results in a proportionate torque curve over all speed ranges.

Another object is the provision in an engine of the character described of a novel hydraulic control system which provides automatic regulation of the supercharge pressure in respect to the fuel injection pressure which is directly proportional to the engine load.

A further object of the invention is to provide a novel lubricating means which include a centrifugal unloader which serves as a hydraulic speed determinator and also serves to increase the lubricating pressure and flow as the speed increases.

Still other objects of my invention include providing such means that are positive in operation, convenient in use, economical of manufacture, relatively simple, and of general superiority and serviceability.

The invention also comprises novel details of construction and novel combinations and arrangements of parts, which will more fully appear in the course of the following description. However, the drawing merely shows and the following description merely describes embodiments of the present invention, which is given by way of illustration or example only.

In the drawings, like reference characters designate similar parts in the several views.

Fig. 4 is an enlarged view, in section, taken along the line 4—4 of Fig. 6 showing the inlet and exhaust valve housing structure and associated parts.

Fig. 5 is a sectional view of the same taken along the line 5—5 of Fig. 4.

Fig. 6 is a sectional elevation through the engine, the section being taken through one of the cylinders.

Fig. 7 is a fragmentary sectional view taken along the line 7—7 of Fig. 5.

Fig. 8 is an enlarged fragmentary section taken along the line 8—8 of Fig. 6 and showing the upper piston.

Fig. 9 is a view similar to Fig. 4 showing the exhaust valve in closed position.

Fig. 10 is a view similar to Fig. 6 showing a piston positioned after a movement of the crank shaft of about 30° from that of Fig. 6.

Fig. 11 is a sectional view taken along the line 11—11 of Fig. 13.

Fig. 12 is a fragmentary transverse section showing one of the apertures in the valve plate seen in Figs. 8, 11 and 13.

Fig. 13 is a view similar to Fig. 8 showing the piston and valve positions after the piston has been raised from the position shown in Fig. 8.

Fig. 14 is a cross section view of one of the connecting rods.

Fig. 15 is a view similar to Fig. 4 showing the fuel control check valve in closed position.

Fig. 16 is a view similar to Fig. 15 showing the exhaust valve in partially open position.

Fig. 17 is a view similar to Fig. 6 showing the pistons at the extreme upper end of the stroke.

Fig. 17a is a detail of a check valve construction.

Fig. 18 is a view similar to Fig. 17 showing the pistons nearly at the lower end of their stroke.

Fig. 19 is a view similar to Fig. 1 showing the hydraulic supercharged pressure control system, partly in section.

Fig. 20 is a fragmentary view, in sectional elevation, showing the exhaust valve rocker arm and push rod features.

Fig. 21 is a fragmentary elevation view showing one of the idler sprockets for the exhaust valve control shown in Fig. 20.

Fig. 22 is a sectional view taken along the line 22—22 of Fig. 2.

Fig. 23 is a fragmentary view, partly in section, showing the centrifugal unloader for the lubricating oil pressure.

Fig. 24 is an enlarged sectional view taken along the line 24—24 of Fig. 23.

Fig. 25 is a sectional view taken along the line 25—25 of Fig. 13.

Fig. 26 is a vertical sectional view through a fuel injection pressure regulator adapted to be connected ahead of the regulator shown in Figs. 27 and 28, or the regulator shown in Fig. 29.

Fig. 27 is an elevation view, in section, of the hydraulic control motor regulator.

Fig. 28 is an elevation view, partly broken away, of the hydraulic regulator, shown in Fig. 27, as seen at right angles thereto.

Fig. 29 is an elevation view, in central section, of a modified form of hydraulic control.

Figure 1:
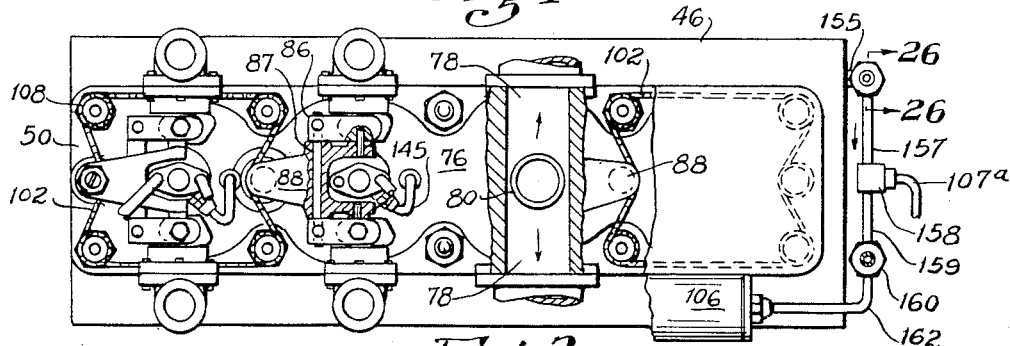
Fig. 1 is a top view, partly broken away, of the engine comprising my invention.
Figure 2:
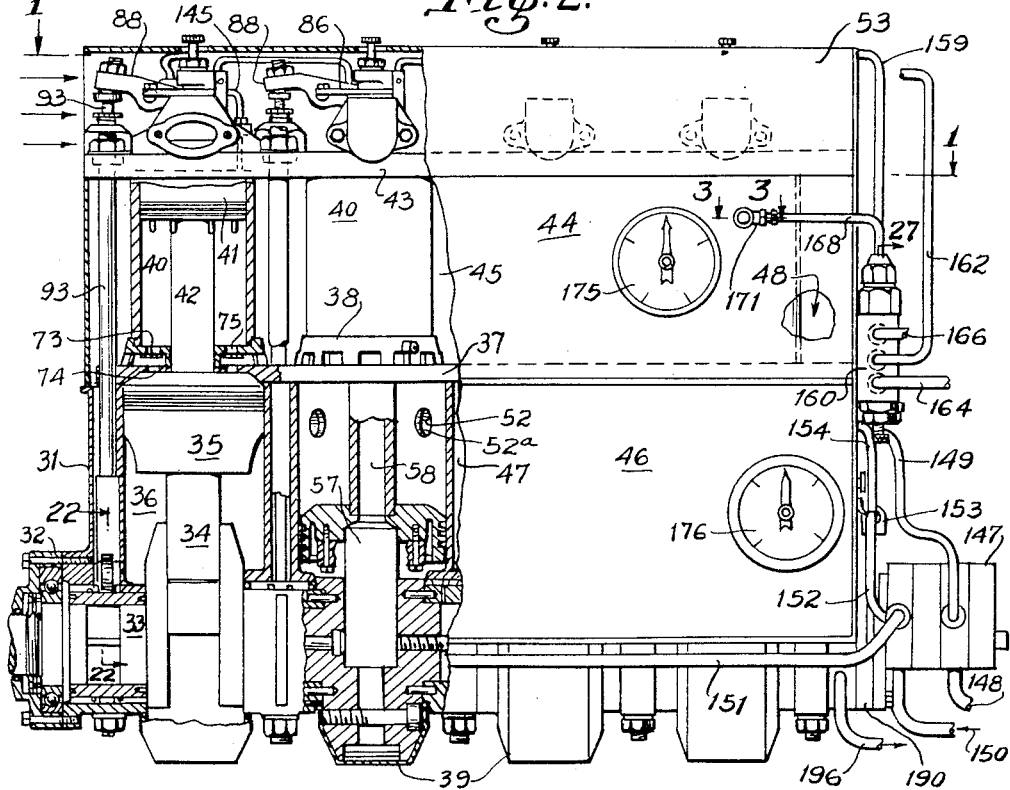
Fig. 2 is a side elevation view, partly broken away and partly in section, of the same.

Referring more particularly to the drawings, I show my engine having a lower cylinder housing 31 which provides bearings 32 for a crank shaft 33 to which are suitably secured a plurality of connecting rods 34. The engine shown has four cylinders, and it will be understood that reference herein to a cylinder or part thereof is duplicated in all four cylinders except where otherwise stated. It is to be understood, however, that an engine having two or more cylinders may be constructed in accordance with the present engine. A lower piston 35 is connected to each connecting rod 34 and is reciprocable in a lower cylinder and precompression chamber 36. A plate 37 extends across the top of the cylinders 36 and supports an upper cylinder base 38, one for each cylinder. Each cylinder 36 has an enlarged lower portion 36a to which is secured a crank case or pan 39 individual to each cylinder. An upper cylinder 40 is positioned on each base 38 in which is reciprocable an upper or main piston member 41. A piston rod member 42 is suitably secured to piston member 41 and is also secured as by threaded connection to lower piston 35, from which construction it will be clear that pistons 35 and 41 reciprocate as a unit, piston rod member 42 passing through a central ring sealed opening in base 38 and also plate 37. A plate 43 extends across upper cylinders 40 and secures walls 44 on the upper portions of cylinders 36, which walls form a super-charge pressure receiver 45. Walls 46 are extended around the sides and ends of lower cylinders 36 and provide an air inlet chamber 47 in communication with a duct 48 at the rear of the engine, which duct is in communication with an air inlet manifold 50, a suitable housing for which is provided. Cylinder portion 36a and crank case 39 form a precompression chamber 51, there being ports 52 having check valves 52a in cylinder portion 36. An exhaust manifold 53 is provided outside of inlet manifold 50. Cylinder portions 36a are provided with ports 54 having check valves 55 therefor normally retained in closed position by springs 56.

Lower piston 35 is provided with a passage 57 communicating with a bore 58 in piston rod 42. Piston member 41 has a knocker pin 59 on the top thereof which unseats a valve member for the combustion chamber, as will be more fully described hereinafter. The upper end of piston rod 42 is formed with a piston portion 60 which is suitably secured to piston member 41 and has compression sealing rings 61 engaging the inner wall of cylinder 40. The upper end of piston rod 42 is formed with a valve seat 62 for a valve 63 and a plurality of ports 64 communicate with vertical passages 65 in piston members 41 and 60. A valve 66 is located in the upper portion of each passage 65 and when seated closes the passage, the valves 66 being provided with bosses 66a on the upper portion thereof to provide spacing between the valve and an annular valve plate member 67 having a plurality of inclined ports 68. An annulus 69 is secured to piston member 60 and has secured thereto a plurality of downwardly projecting pins 70. Cylinder base members 38 are each provided with a plurality of webs 71 which form passages between a chamber 72 and supercharge receiver 45, and an annular valve 73 is positioned to be reciprocable in chamber 72 and is adapted to close a plurality of ports 74 in plate 37 and a similar number of ports 75 in cylinder bases 38. On the downward stroke of the piston, pins 70 push valve 73 down on ports 74.

A cylinder head block 76 is provided for each upper cylinder 40 and each block 76 has an opening 77 in the top thereof, and a pair of laterally extending exhaust passages 78. Each upper cylinder 40 has a top opening 79 forming a valve seat for an exhaust valve sleeve 80 which has a lower annular valve seating edge 81 adapted to seat, when closed, on valve seat 79.

An inlet valve housing 84 is secured as by bolts 85 to cylinder head block 76, and a pair of laterally extending leaf springs 86 are secured on block 76 held by housing 84 and bolts 85. Springs 86 resiliently support a bearing pin 87 which pivotally carries a rocker arm 88, one end of which is bifurcated and carries bearing pins 90 which pivotally support valve sleeve 80. The other end of rocker arm 88 is threaded for a bearing stud 91 which has a lock nut 92 thereon, and the lower end of stud 91 is rounded for engagement in the dished end of a push rod 93 which has a shouldered portion 94. Push rod 93 extends through a threaded sleeve 95. Sleeve 95 has threaded engagement in a collar 96 suitably supported in the top of cylinder block 76, and a cam roller 97 is secured at the lower end of push rod 93 and rides on a cam 98 on crank shaft 33, there being provided a step 99 such that the radius of cam 98 increases gradually from the step 99 during the rotation of the cam.

Sleeves 95 each have a flanged portion forming sprocket teeth 101 adapted to be engaged and turned by one or the other of a pair of chains 102 which are secured so as to operate together by a bar 103 which has a pin 104 secured to a piston rod 105 which is reciprocable, and the ends thereof will move in cylinders 106 and 107 in a manner to be more fully explained hereinafter.

A plurality, four in number, of idler sprockets 108 (Fig. 21) are mounted on each cylinder head block 76 by a stem 109 which is pivotable in a bearing stud 110 suitably secured in block 76 and provided with a lock nut 111. It will thus be seen that when piston rod 105 is pushed to the right or left, as seen in Fig. 19, chains 102 will be pulled, turning sprockets 108 and sleeve 95, which will be raised or lowered in collar 96, thus increasing or decreasing the distance push rod 93 can be pushed down because of the engagement of shoulder 94 with sleeve 95 thereby limiting the rocking movement of rocker arm 88 and with it valve sleeve 80, whereby to increase or decrease the maximum opening of the exhaust space provided by annular portions 81 and valve seat 79.

Piston 105 and cylinders 106 and 107 comprise a hydraulic motor control device 112, to be more fully described hereinafter.

Valve housing 84 has a cylindrical portion 114 provided with packing rings 115 for the bore of valve sleeve 80 which, as stated above, is reciprocable externally of portion 114. A bore 116 extends vertically through housing 84 and has an annular enlargement or chamber 117. A flange member or spray nozzle 118 extends upwardly in the lower portion of bore 116 and is secured by a threaded cap 119 and the flanged portion of member 118 seats against the lower face of cylinder portion 114 which is provided with a spiral groove 120 (Fig. 7).

An injection bomb member 121 is threadedly secured to member 118 and cylindrical in form but spaced by a space 122 from the inner wall of valve sleeve 80 which space forms a clearance or bleed off passage for operation of the exhaust valve sleeve.

A fuel inlet pipe 124 is connected into each inlet valve housing 84 and into chamber 117 and an outlet pipe 125 is similarly connected, which pipe 125 connects to the inlet pipe 124 of the next cylinder such that a supply of inlet fuel is provided in all of chambers 117 at substantially the same pressure.

Cap member 119 is seen to be spaced from the walls of bore 116 such that fuel from chamber 117 may enter chamber 116, and a fuel inlet opening 126 is provided in the top of cap 119. Flange member 118 is provided with a bore 127 extending downwardly in the upper portion thereof and a plurality of diagonal bores 128 extend from bore 127 into a chamber 130 in bomb member 121. A check valve member 131 is provided with a bore which is guided on a boss extending downwardly from member 118 and is provided with a plurality of side ports 132 and a bottom port 133 and contains an injection release valve 134, which, when seated, closes ports 132 and 133, and valve 131 closes a port 135 in the bottom of bomb member 121. Valve 134 is unseated by knocker pin 59 on piston member 41. A bore or passage 136 extends diagonally through member 118 and communicates between the inner end of spiral passage 120 and the interior of check valve member 131.

A needle valve housing member 137 is threadedly positioned in the top of bore 116 and secured thereon by a lock nut 138, and a needle valve stem 139, secured by a lock nut 140, extends downwardly in a bore 141 in member 137. A compensating bellows element 142 is secured on member 137 and a needle valve 146 extends downwardly therefrom and controls fuel inlet opening 126, a ball check valve 143 being positioned within cap member 119 and adapted to close bore 127. A passage 144 extends laterally in housing 137 and communicates with bore 141 and has an external pipe connection 145 as will be more fully explained hereinafter. Pipe 145 connects through a fitting and passage in cylinder head block 76 and the top of cylinder 40 such that combustion characteristics are transmitted to the interior of bellows 142 as controlled by needle valve 139.

Oil and fuel are supplied to the engine under pressure supplied by a duplex pump 147 to which are connected a fuel inlet pipe 148 from any suitable reservoir and a fuel pressure supply pipe 149 which is connected to the inlet pipe 124 of inlet valve housing 84 of the end cylinder. A lubricating oil inlet pipe 150 is connected to pump 147 from a suitable reservoir or supply of lubricating oil, and a lubricating pressure supply pipe 151 is connected from pump 147 to front bearings 32 of crank shaft 33 and oil is thereafter forced through the crank shaft for lubrication of all of the bearings in conventional manner, the bearings being sealed to prevent oil spray to the air passing therethrough. A lubricating oil pressure pipe 152 is connected by a T connection from pipe 151 to a cross head metering device 153 and thence through a lubricating line header 154 to the pre-compression and working cylinders for lubricating the rings of the pistons.

As stated hereinabove each inlet valve housing has an outlet pipe 125 connected to the inlet pipe 124 of the next adjacent cylinder valve housing, and the end cylinder valve housing. Outlet pipe 125 is connected by a pipe 155 to a fuel injection pressure regulator 156 (Fig. 26) which has an outlet pipe connection 157 which connects to a T fitting 158 from which a pipe 159 leads to a hydraulic motor control regulator 160 (Figs. 27 and 28) having an inlet port 161. A pipe 162 is connected between a port 163 of regulator 160 and cylinder 106 of a hydraulic motor control device 112. A pipe 107a leads from T fitting 158 to cylinder 107 of control device 112.

Figure 3:
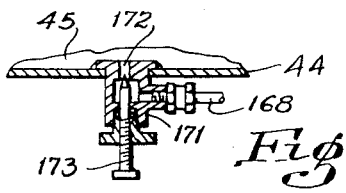
Fig. 3 is a fragmentary view, in section, taken along the line 3—3 of Fig. 2 showing the supercharge pressure dampening valve.

A pipe 164 leads from a port 165 in regulator 160 to the main fuel storage means. A pipe 166 leads from a port 167 to the fuel supply or drip means or reservoir. A pipe 168 is connected to a fitting 169 on the top of regulator 160 and communicates with a supercharge pressure bellows 170 therein. Pipe 168 connects the bellows with a supercharge pressure dampening valve 171 (Fig. 3) secured on and opening through wall 44 which forms supercharge pressure receiver 45. Valve 171 has a valve orifice 172 and a needle valve stem 173 provided with a knurled head by which the needle valve may be adjusted to vary the amount of the valve orifice opening.

I show a gauge 175 positioned on wall 44 for reading the supercharge pressure in chamber 45, and I further show a gauge 176 on wall 46 and connected with, and adapted to, indicate the pressure of lubricating pressure line 152 or 154. Bellows 170 has a piston portion 177 within a sleeve 178 which has a semi-circular port 179 communicating with port 161 and pipe 159 such that the movement of piston 177 due to varying pressure in bellows 170 varies the port opening 179 and controls the pressure in pipes 157 and 107a and cylinder 106, sleeve 178 having port openings communicating with ports 163 and 167, respectively, as may be seen in Fig. 29 which shows a modified form of regulator, the modifications, however, relating to other features. Sleeve 178 is open at the bottom which opening communicates with port 165 and is controlled by a valve 180 seated on a spring 181, the pressure of which may be controlled and varied by an adjusting screw 182 extending through the bottom of the regulator housing.

In Fig. 29 I show a modified form of regulator 160a in which the valve is designated 180a and includes a stem 183 adapted to engage the end of piston 177. A stem 184 extends through a bushing 185 in regulator housing 160a. A spring 181a seats between bushing 185 and valve 180a. A pipe 186 connects with the lubricating pressure line 151 and the bore of the bushing 185 such that the pressure in pipe 186, if above equilibrium, will seat valve 180a against sleeve 178 and close off communication with port 165 and pipe 164, however, if this pressure is low, valve 180a will open. The inlet to regulator 156 is preceded by valve 187 seated by spring 188, which in turn is seated on an adjustable stem member 189 by which the fuel injection pressure may be controlled and varied manually.

In Fig. 23 I show a hydraulic speed determinator or centrifugal unloader 190 which is mounted on the rear end of crank shaft 33, and includes a tubular portion 191 having peripheral passages which connect with an outlet pipe connection 192 in a fixed portion of the unloader housing. Tubular portion 191 has a plurality of apertures 193 forming valve seats for ball valves 194, and an annular recess external to tubular portion 191 communicates with a passage 195 running through the crank shaft, receiving oil supplied therethrough from supply pipe 151. Oil which passes through unloader 190 leaves through outlet 192 and a pipe 196 and returns to the oil supply or sump.

In the operation of the engine air enters at the top through inlet manifold or air chamber housing 50 and passes over and around the tops of cylinder head blocks 76 and downwardly through duct 48 into air inlet chamber 47. This fresh cool air performs a cooling function for the cylinder heads and fuel inlet parts thereon. This air from chamber 47 then enters pre-compression crank chamber 51 through ports 54 during the up-stroke, valves 55 being unseated during this movement. When the cross head piston 35 is at its lowermost position air in crank chamber 51 is partially compressed and a portion of it moves up around and above piston 35 and supplements the volume of air present in cylinder 36 and is ultimately forced through ports 74 into super-charge receiver 45.

When the pistons move downwardly the air trapped in crank case chamber 51 is compressed to approximately thirty pounds per square inch, which pressure is transmitted into supercharge receiver 45.

At the end of the downward stroke pins 70 on upper piston 60 move annular valve 73 to close ports 74 and open ports 75, and air from super-charge receiver 45 moves into upper cylinder 40 through ports 75, Fig. 8, until a sufficient pressure has been developed in lower cylinder 36 to move annular valve 73 up to close ports 75. On the downward stroke the supercharged air under piston 60 is then moved up through passages 65 and past valves 66 above piston 41 when cylinder 40 has exhausted below the supercharged pressure below piston 60.

Some of the air drawn into pre-compression chamber 51 during the suction stroke of pistons 35 and 41 moves up through bore 58 in piston rod 42, past check valve 63 therein, and through ports 64 and downwardly through passages 65 and ports 75 into super-charging chamber 45, it being understood that the combustion pressure above piston member 41 holds valves 66 closed during this movement. When the pistons approach or reach bottom stroke the combustion pressure in cylinder 40 becomes less than the super-charge pressure below valves 66, whereupon said valves are raised from their seats and permit this super-charged air to enter cylinder 40 above piston 41 by passing through ports 68 in annular valve plate member 67, and by virtue of the inclined formation of ports 68 the turbulence of flow follows an orderly centrifugal pattern. This highly induced turbulence, at the rate of eleven hundred feet per second, actually has time and momentum to make approximately one hundred full turns after the fuel has been introduced into the cylinder, when operating at twenty-four hundred R. P. M., thus providing for complete combustion by insuring complete mixing of the fuel and the products of explosion after leaving the bomb chamber 121. At the bottom stroke pins 70 on annulus 69 engage annular valve 73, opening ports 75 to the super-charge chamber 45 and closing ports 74 to cylinder 36. During the period valves 66 are open the inlet air moving into cylinder 40 forces the exhaust gases upwardly in the cylinder and out through exhaust ports 78, and thence through exhaust manifold 53 to the atmosphere, exhaust sleeve valve 80 being permitted to open under the positive cylinder pressure by the action of rocker arm 88, push rod 93 and cam 98.

Due to the high velocity of the exhaust gas discharge, due to a pressure of about thirty pounds per square inch, the exhaust function is performed very quickly and may be accomplished through a small opening of valve 80. The flow of air then continues, for the approximately 75% remaining duration of the exhaust valve phase, through the cylinder, past the inclined bottom portion of injection bomb member 121 and out through the exhaust passages, thereby putting all the hot surfaces of the internal engine in direct contact with air which acts as a cooling medium for those parts. On the completion of this function the exhaust valve is closed mechanically by the operation of cam 98, however, the flow of air from the super-charging chamber continues past valves 66, thereby creating an elevated or super-charged pressure within the cylinder before the piston has had sufficient time to appreciably function as a compressor. This novel method of super-charging along with the positive displacement source of super-charge pressure offers new means of application to an unlimited super-charge pressure in designs of greater extremes, making possible engines having specific weight of four or five horse-power per pound and possibly even more.

The super-charge pressure is preferably designated by a valve opening of either varying area or varying time duration. This is explained by virtue of the fact that the engine is displacing a fixed volume of air at each revolution, and unless the air is more restricted at lower speeds than at higher speeds, this fixed volume would have more time to travel through, and consequently would be greatly reduced in pressure.

Exhaust valve 80 and injection bomb chamber 121 combine to perform this function through the application of variable area. This variable area is provided by the amount valve 80 is permitted to open, its opening being accelerated by the pressure in the cylinder at cut-off. The vertical position of sleeve 95 determines the throw of push rod 93 and therefore the amount valve 80 is permitted to open, the position of sleeve 95 being determined by the hydraulic differential or equilibrium, which ever is the case, in the hydraulic motor control device 112. It will be realized that due to the high pressures within the working cylinder, positive means must be provided to insure valve 80 seating firmly on valve seat 79, and this is accomplished by the deflection of springs 86 which support the rocker arm shaft 87. The deflection of these springs is very small with respect to the travel of the valve sleeve 80, therefore, on the closing lobe of the cam the resistance of these springs does not become a factor until the valve is actually closed and the cam is within .008" of its ultimate rise. This final .008" rise should be very gradual because the effort to overcome the spring load will increase in direct proportion to the increasing cylinder pressure throughout the compression stroke.

Fuel is admitted to inlet housing 84 of each cylinder of the engine, as set forth hereinabove, and a supply of fuel is maintained under pressure in chamber 117. Fuel from chamber 117 passes upwardly around cap 119 and is admitted through port 126 into bore 127, past needle valve 146 in an amount determined by the pressure present in bellows 142 acting on needle valve 146 which restricts flow past orifice 126. The fuel is then admitted through passages 128 into bomb chamber 130 which operates at an exceedingly high temperature because of its isolation from cool areas, and the fuel in the chamber is ignited by this temperature along with heat of adiabatically compressed air being forced into the chamber sometime during the compression stroke, and creates a high pressure therein since valves 131 and 134 are seated and closed. Upon the piston reaching top stroke, knocker pin 59 unseats valve 131 and permits the preignited fuel, under its high pressure within chamber 130, to pass through port 135 being deflected generally into the combustion chamber, and exert its pressure upon mixing and igniting with the combustion chamber air in cylinder 40 to be expended on piston 41, thus providing the work stroke of the engine. Upon completion of combustion, valve 134 is closed by connection with bore 128 when a component of the compression pressure which passes through passage 135 forces check valve member 131 upward when new air charge is being supplied to bomb chamber 130 during compression stroke prior to combustion. Check valve 134 is held in upper position against the extension portion of flange member 118 due to the long spiral bleed off passage 120 which is under a reduced pressure during a portion of the downward stroke and is under an increased pressure at the start of the compression stroke. Valve 134 moves downwardly with valve member 131, thus closing port 135, due to high pressure within chamber 130.

It will thus be seen that combustion does not occur in cylinder 40 until top stroke and the mechanical opening of valve 134 and, therefore, there is no loss of efficiency due to pre-combustion within cylinder 40 before top stroke due to varying conditions of fuel, atmosphere etc. which occur in other types of engine depending entirely upon cylinder pressure compression ignition necessitating early fuel injection. In the engine comprising this invention, pre-combustion is definitely provided for within bomb chamber 130 permitting a conditioning of fuel by high temperature and pre-combustion gasification for a long comparative time although isolating it within the bomb chamber until the mechanical criterion of opening valve 134 has been accomplished. There is therefore a positive control over actual fuel injection into the working cylinder at all times free from influence of the uncertain and variable period of pre-combustion which occurs in cylinders of this type when the fuel is admitted directly into the working cylinder, and are attended by severe ignition lag which interferes with accomplishing a constant pressure cycle.

Inasmuch as the time of beginning of effective injection of the fuel is positive, the rate of injection may thereupon be controlled by restriction of the fuel inlet which is controlled by needle valve 146, the position of which is controlled and determined by the average effective pressure in cylinder 40 transmitted by pipe 145 into bore 141, the effect of which pressure within bellows 142, and therefore on needle valve 146, may be influenced by the amount of the discharge opening of bore 141 which is regulated manually by needle valve stem member 139 in order to balance fuel energy between cylinders.

The fuel injection is further influenced by the effective fuel pressure in chamber 117, which pressure is controlled by the fuel pressure regulator device 156 (Fig. 26) in which, as explained hereinabove, the return fuel flow from the end cylinder pipe 125 is restricted by the permitted spring pressure on valve 187 which can be controlled manually. There is thus a differential control on the fuel injection, both from the effective pressure in cylinder 40 and the fuel pressure in chamber 117, and the differential of these pressures, effective at needle valve 146 determines or varies the fuel injection according to variations in load or speed of the engine.

The hydraulic motor control regulator 160 also performs an isochronous regulation with respect to the varying hydraulic differentials. The fuel flow after it has passed the fuel pressure and engine load control (fuel pressure minimum approximately 100 pounds), passes through pipe 159 and escapes through a continuing by-pass valve 180 through pipe 164 to the main fuel storage means. This pressure once determined remains constant and is common to the hydraulic control motor 112, pipe 162 and cylinder 106, and exerts this continuing pressure on piston 105. Bellows 170, which controls piston 177, is exerting a force downwardly, or in a port closing position, and is responsive to the pressure in the receiver through pipe 168, and is affected by the super-charge pressure dampening valve 173. If this pressure tends to increase, the regulating plunger will be forced downwardly or in a closing direction by virtue of the fact that the force behind it became greater than the force resisting it. The plunger, however, will continue in motion until an equilibrium has again been obtained. Its downward movement results in restricting the passage from the supply line creating a higher pressure therein which is connected through the T to the other end of the hydraulic control motor regulator. Restriction here could reach an infinite value. For this reason a line with a check valve returning to the inlet side of the fuel pressure and engine load control 156 is necessary to prevent the pressure from rising higher than the injection pressure and resulting in engine acceleration.

This elevated pressure then becomes common through pipe 107a, through T fitting 158 to cylinder 107 of the hydraulic control motor 112. This elevated pressure then overbalances the pressure in cylinder 106 on piston 105 and tends to move the piston to the right, as seen in Fig. 19. Piston 105 is connected with pin 104 on bar 103 to control and move chain 102 and rotate sleeve 95, which as stated above, permits the exhaust valve 80 to open to a lesser degree, thus restoring an equilibrium in the regulated super-charge pressure of the engine. A similar procedure in the opposite direction will occur upon the super-charge pressure becoming reduced due to changes in the operating requirements of the engine.

As set forth hereinabove in the specific description of the engine construction, increased efficiency is achieved by the intake air which passes over, around and through the parts subjected to the highest temperatures, which air is, itself, acting as a cooling medium an amount which contributes to the simplicity of design and ability to control the temperature of internal hot parts under increased heat of combustion due to supercharging, thus permitting higher overall operating temperatures with attending high efficiency due to better temperature control of critical parts. Further efficiency is accomplished by carburetion of water to a vapor which is admitted to the intake air by a substantially conventional carburetor, it being known that more efficient combustion occurs when the intake air contains a percentage of moisture or water vapor. This function also contributes to the efficiency of the cooling by a more rapid absorption of heat from the hot engine parts, and the intake air has a higher specific heat with an increase in its vapor content.

Having thus described my invention, what I claim and desire to secure by Letters Patent is:

1. An internal combustion engine comprising a working cylinder having a base and a head, a piston in said cylinder having a rod member reciprocable through said base, a pre-compression cylinder having a piston on said rod member, a crank case connected to said pre-compression cylinder, a crank shaft extending through said crank case, a connecting rod connected to said crank shaft and pre-compression piston, an air inlet to said working cylinder through said crank case, an exhaust valve and a fuel inlet in said working cylinder head, and a valve in said fuel inlet adapted to be actuated by said first piston.

2. An internal combustion engine comprising a working cylinder having a base and a head, a piston in said cylinder having a rod member reciprocable through said base, a pre-compression cylinder having a piston on said rod member, a crank case connected to said pre-compression cylinder, a super-charging chamber external to said working cylinder, valve means between said cylinders and said chamber, a crank shaft extending through said crank case, a connecting rod connected to said crank shaft and pre-compression piston, an air inlet to said working cylinder through said crank case, an exhaust valve and a fuel inlet in said working cylinder head, and a valve in said fuel inlet adapted to be actuated by said first piston.

3. An internal combustion engine comprising a working cylinder having a base and a head, a piston in said cylinder having a hollow rod member reciprocable through said base, a pre-compression cylinder having a piston on said rod member, a crank case connected to said pre-compression cylinder, a crank shaft extending through said crank case, a connecting rod connected to said crank shaft and pre-compression piston, an air inlet to said working cylinder through said crank case and piston rod member, an exhaust valve and a fuel inlet in said working cylinder head and a valve in said fuel inlet adapted to be actuated by said first piston.

4. An internal combustion engine comprising a working cylinder having a base and a head, a piston in said cylinder having a rod member reciprocable through said base, a pre-compression cylinder having a piston on said rod member, a crank case connected to said pre-compression cylinder, a crank shaft extending through said crank case, a connecting rod connected to said crank shaft and pre-compression piston, an air inlet to said working cylinder through said crank case and piston rod member and working cylinder piston, said working cylinder piston having inlet valve means therein, an exhaust valve and a fuel inlet in said working cylinder head and a valve in said fuel inlet adapted to be actuated by said first piston and a check valve in said piston rod member.

5. An internal combustion engine comprising a working cylinder having a base and a head, a piston in said cylinder having a rod member reciprocable through said base, a pre-compression cylinder having a piston on said rod member, a crank case connected to said pre-compression cylinder and forming a pre-compression chamber therewith, a super-charging receiver external to said working cylinder, valve means between said cylinders and said super-charging chamber, a crank shaft extending through said crank case, a connecting rod connected to said crank shaft and pre-compression piston, an air inlet to said working cylinder through said crank case and pistons, an exhaust valve and a fuel inlet in said working cylinder head, and a valve in said fuel inlet adapted to be actuated by said first piston.

6. An internal combustion engine comprising a working cylinder having a base and a head, a piston in said cylinder having a hollow rod member reciprocable through said base, a pre-compression cylinder having a piston on said rod member, a crank case connected to said pre-compression cylinder, a super-charging chamber external to said working cylinder, a crank shaft extending through said crank case, a connecting rod connected to said crank shaft and pre-compression piston, an air inlet to said super-charging chamber through said crank case and piston rod member, an exhaust valve and a fuel inlet in said working cylinder head, and a valve in said fuel inlet adapted to be opened by said first piston.

7. An internal combustion engine comprising a working cylinder having a base and a head, a piston in said cylinder having a rod member reciprocable through said base, a pre-compression cylinder having a piston on said rod member, a crank case connected to said pre-compression cylinder and forming a pre-compression chamber therewith, a crank shaft extending through said crank case, a connecting rod connected to said crank shaft and pre-compression piston, an air inlet to said working cylinder through said crank case and cylinder base and working cylinder piston, an exhaust valve and a fuel inlet in said working cylinder head, and a valve in said fuel inlet adapted to be opened by a knocker pin on said first piston.

8. An internal combustion engine comprising a working cylinder having a base and a head, a piston in said working cylinder having a rod member reciprocable through said base, a pre-compression cylinder having a piston on said rod member, a crank case connected to said pre-compression cylinder, a crank shaft extending through said crank case, a connecting rod connected to said crank shaft and pre-compression piston, an air inlet to said working cylinder through said crank case and piston rod member and working cylinder piston, said working cylinder piston having inlet check valve means therein, an exhaust valve and a fuel inlet in said working cylinder head, and a valve in said fuel inlet adapted to be actuated by said first piston.

9. An internal combustion engine comprising a working cylinder having a base and a head, a piston in said cylinder having a rod member reciprocable through said base, a pre-compression cylinder having a piston on said rod member, a crank case connected to said pre-compression cylinder, a super-charging chamber external to said working cylinder, a crank shaft extending through said crank case, a connecting rod connected to said crank shaft and pre-compression piston, an air inlet to said working cylinder through said crank case and working cylinder piston, said working cylinder piston having inlet check valve means therein, and an exhaust valve and a fuel inlet in said working cylinder head, said pre-compression cylinder having a valved connection to said super-charging chamber.

10. An internal combustion engine comprising a working cylinder having a base and a head, a piston in said cylinder having a rod member reciprocable through said base, a pre-compression cylinder having a piston on said rod member, a crank case connected to said pre-compression cylinder, a super-charging chamber external to said working cylinder, a crank shaft extending through said crank case, a connecting rod connected to said crank shaft and pre-compression piston, an air inlet to said working cylinder through said crank case and working cylinder piston, said working cylinder piston having inlet check valve means therein, and an exhaust valve and a fuel inlet in said working cylinder head, said base having a valved connection to said super-charging chamber, said pre-compression cylinder having a valved connection to said super-charging chamber.

11. An internal combustion engine comprising a working cylinder having a base and a head, a piston in said cylinder having a rod member reciprocable through said base, a pre-compression cylinder having a piston on said rod member, a crank case connected to said pre-compression cylinder, a super-charging chamber external to said working cylinder, a crank shaft extending through said crank case, a connecting rod connected to said crank shaft and pre-compression piston, an air inlet to said working cylinder through said crank case and working cylinder piston, said working cylinder piston having inlet check valve means therein, and an exhaust valve and a fuel inlet in said working cylinder head, said base having a valved connection to said super-charging chamber, said pre-compression cylinder having a valved connection to said super-charging chamber, said working cylinder piston having means adapted to actuate the valve of said valved connections.

12. An internal combustion engine comprising a working cylinder having a base and a head, a piston in said cylinder having a rod member reciprocable through said base, a pre-compression cylinder having a piston on said rod member, a crank case connected to said pre-compression cylinder, a super-charging chamber external to said working cylinder, a crank shaft extending through said crank case, a connecting rod connected to said crank shaft and pre-compression piston, an air inlet to said working cylinder through said crank case and working cylinder piston, said working cylinder piston having inlet check valve means therein and an exhaust valve and a fuel inlet in said working cylinder head, said base having a port connection to said super-charging chamber, said pre-compression cylinder having a port connection to said super-charging chamber, a valve adapted to alternately open and close said ports, said working cylinder piston having means adapted to actuate said valve to open said base port and close said pre-compression cylinder port.

13. An internal combustion engine comprising a working cylinder having a base and a head, a piston in said cylinder having a rod member reciprocable through said base, a pre-compression cylinder having a piston on said rod member, a crank case connected to said pre-compression cylinder, a super-charging chamber external to said working cylinder, a crank shaft extending through said crank case, a connecting rod connected to said crank shaft and pre-compression piston, an air inlet to said working cylinder through said crank case and working cylinder piston, said working cylinder piston having inlet check valve means therein and an exhaust valve and a fuel inlet in said working cylinder head, said base having a port connection to said super-charging chamber, said pre-compression cylinder having a port connection to said super-charging chamber, a valve adapted to alternately open and close said ports, said working cylinder piston having pin means adapted to actuate said valve to open said base port and close said pre-compression cylinder port.

14. In an internal combustion engine having a working cylinder, a pre-compression cylinder, pistons therein having a crank and cam shaft connection, and inlet valve means, in combination an exhaust valve for said working cylinder, a rocker arm mounting for said exhaust valve, a push rod for said rocker arm actuatable from the cam shaft and means to vary the amount of opening of said exhaust valve as the engine load varies, said last means including an adjustable push rod stroke limiting sleeve and a hydraulic control motor adapted to actuate said sleeve.

15. In an internal combustion engine having a working cylinder, a pre-compression cylinder and super-charging chamber, pistons therein having a crank and cam shaft connection, and inlet valve means, in combination an exhaust valve for said working cylinder, a rocker arm mounting for said exhaust valve, a push rod for said rocker arm actuatable from the cam shaft and means to vary the amount of opening of said exhaust valve as the super-charging chamber pressure varies.

16. In an internal combustion engine having a working cylinder, pre-compression cylinders and super-charging chamber, pistons therein having a crank and cam shaft connection, means to provide a supply of fuel under pressure, and inlet valve means, in combination an exhaust valve for said working cylinder, a rocker arm mounting for said valve, a push rod for said rocker arm actuatable from the crank and cam shaft and means to differentially vary the amount of opening of said exhaust valve as the super-charging chamber and fuel pressures vary.

17. In an internal combustion engine having a working cylinder, a pre-compression cylinder, pistons therein having a crank and cam shaft connection, and inlet valve means, in combination an exhaust valve for said working cylinder, a rocker arm mounting for said valve, a push rod for said rocker arm actuatable from the crank and cam shaft and means to vary the amount of opening of said exhaust valve as the engine load varies, said last means including an adjustable push rod stroke limiting sleeve having a sprocket, a chain on said sprocket, and a hydraulic control motor adapted to actuate said sleeve.

18. In an internal combustion engine having a working cylinder, a pre-compression cylinder and super-charging chamber, pistons therein having a crank shaft connection, means to provide a supply of fuel under pressure, and inlet valve means, in combination an exhaust valve for said working cylinder, a rocker arm mounting for said valve, a push rod for said rocker arm actuatable from the crank shaft, means to vary the amount of opening of said exhaust valve, and a hydraulic motor control regulator responsive to differentials of said super-charging chamber and fuel supply pressures.

19. In an internal combustion engine having a working cylinder, a pre-compression cylinder and super-charging chamber, pistons therein having a crank shaft connection, means to provide a supply of fuel under pressure, and inlet valve means, in combination an exhaust valve for said working cylinder, a rocker arm mounting for said valve, a push rod for said rocker arm actuatable from the crank shaft, means to vary the amount of opening of said exhaust valve, and a hydraulic motor control regulator responsive to differentials of said super-charging chamber and fuel and lubricating oil supply pressures.

20. In an internal combustion engine having a working cylinder, a pre-compression cylinder and super-charging chamber, pistons therein having a crank shaft connection, means to provide a supply of fuel under pressure, and inlet valve means, in combination an exhaust valve for said working cylinder, a rocker arm mounting for said valve, a push rod for said rocker arm actuatable from the crank shaft, means to vary the amount of opening of said exhaust valve, a hydraulic motor control regulator responsive to differentials of said super-charging chamber and fuel and lubricating oil supply pressures, and centrifugal pressure control means for said lubricating oil supply.

21. In an internal combustion engine having a working cylinder, a pre-compression cylinder and super-charging chamber, pistons therein having a crank shaft connection, means to provide a supply of fuel under pressure, and inlet valve means, in combination an exhaust valve for said working cylinder, a rocker arm mounting for said valve, a push rod for said rocker arm actuatable from the crank shaft, means to vary the amount of opening of said exhaust valve, a hydraulic motor control regulator responsive to differentials of said super-charging chamber and fuel and lubricating oil supply pressures, and centrifugal pressure control means for said lubricating oil supply comprising a rotatable valve sleeve having ports and ball valves for said ports.

22. In an internal combustion engine, in combination, working cylinders, pre-compression cylinders and a super-charging chamber, cylinder heads having fuel inlet and pre-combustion means, exhaust valves, a crank case for each pre-compression cylinder, and air inlet means to said cylinders over and around said cylinder heads and through said crank cases, said air inlet means adapted to cool said cylinder heads and cylinder surfaces.

CARL B. SUES.

REFERENCES CITED

The following references are of record in the file of this patent:

UNITED STATES PATENTS

| Number | Name | Date |
|---|---|---|
| 628,125 | Sharpneck | July 4, 1899 |
| 876,020 | Salter | Jan. 7, 1908 |
| 950,162 | Stahl | Feb. 22, 1910 |
| 968,200 | Scott | Aug. 23, 1910 |
| 1,040,472 | Wade | Oct. 8, 1912 |
| 1,041,162 | Read | Oct. 15, 1912 |
| 1,162,789 | Loane | Dec. 7, 1915 |
| 1,175,018 | Seymour | Mar. 14, 1916 |
| 1,507,090 | Ruehman | Sept. 2, 1924 |
| 1,760,737 | Boden | May 27, 1930 |
| 1,933,002 | Beyer | Oct. 31, 1933 |
| 1,972,881 | Geisse | Sept. 11, 1934 |